United States Patent
Yan et al.

(10) Patent No.: US 12,119,451 B2
(45) Date of Patent: Oct. 15, 2024

(54) CAPACITY COMPENSATING ELECTROLYTE WITH SULFITE SOLVENT FOR LITHIUM ION BATTERIES WITH SILICON-BASED ANODES

(71) Applicant: Apple Inc., Cupertino, CA (US)

(72) Inventors: Kai Yan, Pleasanton, CA (US); Wei Zhou, Fremont, CA (US); Peng Lu, Santa Clara, CA (US); Tsuyonobu Hatazawa, Tokyo (JP)

(73) Assignee: APPLE INC., Cupertino, CA (US)

( * ) Notice: Subject to any disclaimer, the term of this patent is extended or adjusted under 35 U.S.C. 154(b) by 383 days.

(21) Appl. No.: 17/318,067

(22) Filed: May 12, 2021

(65) Prior Publication Data

US 2021/0376385 A1 Dec. 2, 2021

Related U.S. Application Data

(60) Provisional application No. 63/029,756, filed on May 26, 2020.

(51) Int. Cl.
| | |
|---|---|
| *H01M 10/056* | (2010.01) |
| *H01M 4/38* | (2006.01) |
| *H01M 10/0525* | (2010.01) |
| *H01M 10/0568* | (2010.01) |
| *H01M 10/0569* | (2010.01) |

(52) U.S. Cl.
CPC ....... *H01M 10/0568* (2013.01); *H01M 4/386* (2013.01); *H01M 10/0525* (2013.01); *H01M 10/0569* (2013.01); *H01M 2300/0028* (2013.01)

(58) Field of Classification Search
CPC ......... H01M 10/0568; H01M 10/0569; H01M 10/0567; H01M 10/0566; H01M 10/0525; H01M 10/052; H01M 4/386; H01M 2300/0028; H01M 2300/0034; H01M 2300/0037

See application file for complete search history.

(56) References Cited

U.S. PATENT DOCUMENTS

| | | | |
|---|---|---|---|
| 6,555,272 B2 | 4/2003 | Suzuki et al. | |
| 9,660,239 B2 | 5/2017 | Takase et al. | |
| 9,985,318 B2 | 5/2018 | Zhu et al. | |
| 2013/0334468 A1* | 12/2013 | Taniguchi | H01M 4/1395 252/502 |
| 2018/0287198 A1* | 10/2018 | Liu | C08L 33/06 |

OTHER PUBLICATIONS

Han, B., et al., "Using Mixed Salt Electrolytes to Stabilize Silicon Anodes for Lithium-Ion Batteries via in Situ Formation of Li-M-Si Ternaries (M=Mg, Zn, Al, Ca)", ACS Applied Materials and Interfaces 2019, II 29780-29790 (11 pp).

* cited by examiner

*Primary Examiner* — Raymond Alejandro
(74) *Attorney, Agent, or Firm* — Young Basile Hanlon & MacFarlane, P.C.

(57) ABSTRACT

An electrochemical cell for a lithium ion battery has an anode comprising a silicon-based active material, a cathode comprising a cathode active material, and a capacity compensating electrolyte comprising a linear sulfite-based solvent and a lithium imide salt. A molar ratio of the lithium imide salt to the linear sulfite-based solvent is between 1:5 and 1:1.

15 Claims, 6 Drawing Sheets

CAPACITY COMPENSATING ELECTROLYTE WITH SULFITE SOLVENT FOR LITHIUM ION BATTERIES WITH SILICON-BASED ANODES

CROSS-REFERENCE TO RELATED APPLICATION

This application claims priority to U.S. Provisional Patent Application No. 63/029,756, filed May 26, 2020, the entire contents of which are herein incorporated by reference.

TECHNICAL FIELD

This disclosure relates to capacity compensating sulfite-based electrolytes formulated for use with silicon-based anodes in lithium ion batteries.

BACKGROUND

The use of lithium ion batteries has grown, and in particular, the use of lithium ion batteries using silicon-based anode material. Silicon is used as anode material in lithium ion batteries because silicon has a high theoretical capacity, providing batteries with improved energy density. Although the energy density of lithium ion batteries has been increased with the use of silicon-based anode material, the silicon-based material has limited cycle life due to the large volume changes that silicon-based materials undergo during battery cycling. These large volume changes, as large as 300%-400%, can result in fracture of silicon particles, isolated fragments of particles that no longer contribute to capacity, and a weak solid-electrolyte interphase (SEI) prone to cracking and delamination. This limited cycle life prevents wider application of the technology.

Some efforts to improve the performance of lithium ion batteries having silicon-based anodes focus on the addition of special additives to the electrolyte. However, it has been found that additives at most delay the unavoidable decay of performance of such batteries. Once the additives are depleted, the fading of cell capacity occurs quickly.

SUMMARY

Disclosed herein are implementations of electrolytes for use in electrochemical cells of lithium ion batteries that improve the performance of such batteries when using silicon-based anodes.

One embodiment of an electrochemical cell disclosed herein comprises an anode comprising a silicon-based active material, a cathode comprising a cathode active material, and an electrolyte comprising a linear sulfite-based solvent and a lithium imide salt.

In embodiments of the electrochemical cell, the linear sulfite-based solvent is selected from dimethyl sulfite and diethyl sulfite or a combination thereof.

In embodiments, the linear sulfite-based solvent is the only solvent in the electrolyte.

In embodiment of the electrochemical cell, the lithium imide salt is selected from the group consisting of LiFSI, LiTFSI, LiFTFSI, LiBETI and a combination of two or more thereof.

In embodiments of the electrochemical cell, a molar ratio of the lithium imide salt to the linear sulfite-based solvent is between 1:5 and 1:1.

In embodiments of the electrochemical cell, the electrolyte may include an additive. The additive may be less than 10 wt % of the electrolyte.

In other embodiments disclosed herein, an electrochemical cell can comprise an anode comprising a silicon-based active material, a cathode comprising a cathode active material, and an electrolyte consisting essentially of at least one linear sulfite-based solvent, at least one lithium imide salt, and optionally independently, an additive and a diluent.

Embodiments include methods of making the electrolytes disclosed herein, methods of assembling electrochemical cells and lithium ion batteries including such electrolytes disclosed herein, and using the lithium ion batteries including such electrolytes disclosed herein.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
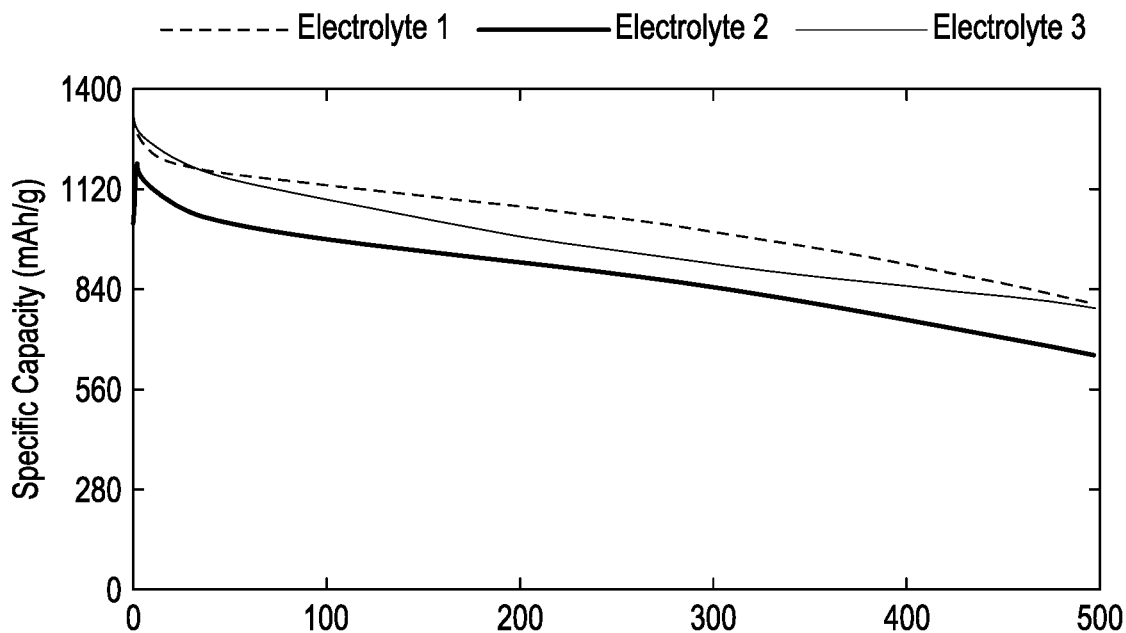
FIG. 1A is a graph of specific capacity of three different electrochemical cells illustrating the improved results using a sulfite-based electrolyte as disclosed herein.

Silicon-based materials are used as anode active material in lithium ion batteries because silicon has a high theoretical capacity, providing batteries with improved energy density. Although the energy density of lithium ion batteries has been increased with the use of silicon-based anode material, the silicon-based material has limited cycle life due to the large volume changes that silicon experiences during battery cycling. These large volume changes, as large as 300%-400%, can result in, as one example, a weakened solid-electrolyte interphase (SEI) prone to cracking and delamination when conventional electrolytes are used.

The SEI is formed by the decomposition of organic and inorganic compounds during cycling, such organic and inorganic compounds components of the liquid electrolyte used in the lithium ion batteries. Conventional electrolytes made with common solvents, most which are carbon-based esters, are intrinsically not compatible with silicon. The structure of the SEI generated from these common solvents cannot accommodate the repetitive and extensive swelling of the silicon in the anode during cycling. With this underlying incompatibility between the electrolyte and the silicon of the anode, the addition of functional molecules as additives to the electrolyte or the anode material may postpone the degradation, but the additives do not solve the degradation of the SEI interface.

Disclosed herein are capacity compensating electrolytes formulated with sulfite-based solvents. These capacity compensating electrolytes with sulfite-based solvents show improved performance in lithium ion batteries with silicon-based anodes over conventional liquid electrolytes. With conventional electrolytes such as those composed of carbonaceous esters, for example, the decay rate of silicon gradually increases, leading to an accelerating decay trend. In comparison, the decay trend is reduced when the conventional solvent is replaced with a sulfite-based solvent. It is found that the decay rate of the lithium ion battery using a sulfite-based electrolyte as disclosed herein actually descends, projecting a much longer cycle life. This change of decay behavior can be significant.

The capacity loss of lithium ion batteries with silicon-based anodes is compensated by the controlled decomposition of solvent in the electrolyte. The capacity compensating electrolytes disclosed herein feature sulfite-based solvents with sulfur at +4 state. During charging, part of the sulfite is converted to +6 state by releasing additional electrons to the system. The decomposition potential and the rate of decomposition of the sulfite solvent is controlled by the concentration of the electrolyte. This is particularly useful in lithium ion batteries with silicon-based anodes where the electrochemical potential drifts as capacity changes.

It is believed that another working mechanism of the sulfite-based electrolytes disclosed herein is the formation of a higher quality sulfur-containing SEI. This sulfur-containing SEI has enhanced ionic conductivity due at least in part to the intrinsic weak bonding between lithium and sulfur-containing SEI. Because of this higher quality SEI, less lithium consumption is required to achieve a stable state, extending the cycle retention of the lithium ion battery. Two times the cycle life of lithium ion batteries with silicon anodes and conventional electrolytes has been realized with the sulfite-based electrolytes disclosed herein.

The disclosed electrolytes are formulated to increase the performance of lithium ion batteries using a silicon-based active material. The silicon-based active material is not limited except to include some form of silicon or silicon alloy. For example, silicon-based active material can have a content of silicon material of greater than or equal to 60 wt %.

The electrochemical cells disclosed herein are unit cells, an assembly of a plurality of electrochemical cells forming a lithium ion battery. The electrochemical cells disclosed herein comprise an anode comprising a silicon-based active material, a cathode comprising a cathode active material and an electrolyte comprising a linear sulfite-based solvent and a lithium imide salt.

In some embodiments herein, the linear sulfite-based solvent replaces in whole conventional solvents used in liquid electrolytes. In these embodiments, the electrolyte consists essentially of at least one linear sulfite-based solvent, at least one lithium imide salt, and optionally independently, an additive and a diluent. The linear sulfite-based solvent can be dimethyl sulfite, diethyl sulfite, or any other linear sulfite-based solvent known to those skilled in the art. The linear sulfite-based solvent can be a combination of two or more linear sulfite-based solvents.

In some embodiments, the linear sulfite-based solvent can be mixed with other solvents, with the linear sulfite-based solvent being 30 wt % or more of the total solvent. Other solvents can include, but are not limited to, linear carbonates, a cyclic carbonates, or linear ethers, such as dimethoxyethane (DME), ethyl methyl carbonate (EMC), dimethyl carbonate (DMC), and diethyl carbonate (DEC). Other solvents can also include ionic liquids, such as N-ethyl-N-methylpyrrolidinium bis(fluorosulfonyl)imide ($PYR_{12}FSI$), N-propyl-N-methylpyrrolidinium bis(fluorosulfonyl)imide ($PYR_{13}FSI$), N-butyl-N-methylpyrrolidinium bis(fluorosulfonyl)imide ($PYR_{14}FSI$), N-propyl-N-methylpyrrolidinium bis(trifluoro-methanesulfonyl)imide ($PYR_{13}TFSI$), or N-butyl-N-methylpyrrolidinium bis(trifluoro-methanesulfonyl)imide ($PYR_{14}TFSI$).

The electrolytes disclosed herein use one or more lithium imide salt selected from the group consisting of lithium bis(fluorosulfonyl)imide (LiFSI), lithium bis(trifluoromethanesulfonyl)imide (LiTFSI), lithium bis(trifluoromethanesulfonyl)imide (LiFTFSI), lithium bis(pentafluoroethanesulfonyl)imide (LiBETI), and other lithium imide salts known to those skilled in the art, and a combination of two or more thereof. It is found that the lithium imide salt, as opposed to more traditional salts such as $LiPF_6$, provides for easier solvation and a higher transference number. Some embodiments may include a combination of lithium imide salts and other lithium salts, including but not limited to lithium hexafluorophosphate ($LiPF_6$), bis(oxalato)borate (LiBOB), oxalyldifluoroborate (LiODFB) and fluoroalkylphosphate (LiFAP).

The easier solvation of the lithium imide salt allows for a molar ratio of the lithium imide salt to the linear sulfite-based solvent between 1:5 and 1:1, inclusive. The higher salt to solvent ratio contributes to the improved performance of the electrolyte in lithium ion batteries having silicon-based anode active material. In addition, higher salt concentration improves the stability of sulfite solvent at the cathode electrolyte interphase.

In embodiments of the electrochemical cell, the electrolyte may include an additive. The additive may be less than 10 wt % of the electrolyte. In some embodiments, the additive may be 5 wt % or less of the electrolyte. The additive may be one additive or a combination of additives. The additives may be, as non-limiting examples, fluoroethylene carbonate (FEC) or vinylene carbonate (VC).

In embodiments of the electrochemical cell, the electrolyte may include one or more diluents. The diluent may comprise a fluoroalkyl ether (also referred to as a hydrofluoroether (HFE)). In some embodiments, the diluent comprises 1,1,2,2-tetrafluoroethyl-2,2,2,3-tetrafluoropropyl ether (TTE), bis(2,2,2-trifluoroethyl) ether (BTFE), 1,1,2,2,-tetrafluoroethyl-2,2,2-trifluoroethyl ether (TFTFE), methoxynonafluorobutane (MOFB), ethoxynonafluorobutane (EOFB), or any combination thereof. In any or all embodiments, the solvent and the diluent may be miscible.

EXAMPLE 1

An electrochemical cell was prepared using a silicon monoxide (SiOx) anode paired with lithium ion phosphate (LFP) cathode. Three different electrolytes were prepared. Electrolyte 1 was prepared using 1.15M $LiPF_6$, 15 wt % ethylene carbonate (EC), 15 wt % propylene carbonate (PC) and 70 wt % diethyl carbonate (DEC). Additives were 7 wt % FEC and 1 wt % VC. Electrolyte 2 was prepared using 1.2M LiFSI, 16.25 wt % dimethyl carbonate (DMC), 4.99 wt % FEC and 0.99 wt % VC as additives, and 83.75 wt % 1,1,2,2-tetrafluoroethyl-2,2,2,3-tetrafluoropropyl ether (TTE) dilute. Electrolyte 3 was prepared using 1.45M LiFSI, 41.5 wt % DMS, 4.14 wt % FEC as additive and 54.36 wt % TTE as diluent. The format used was 30×40 mm single layer pouch (SLP), tested at 2.4-3.6V, 0.5 C with C/40 CVC.

Figure 1B:
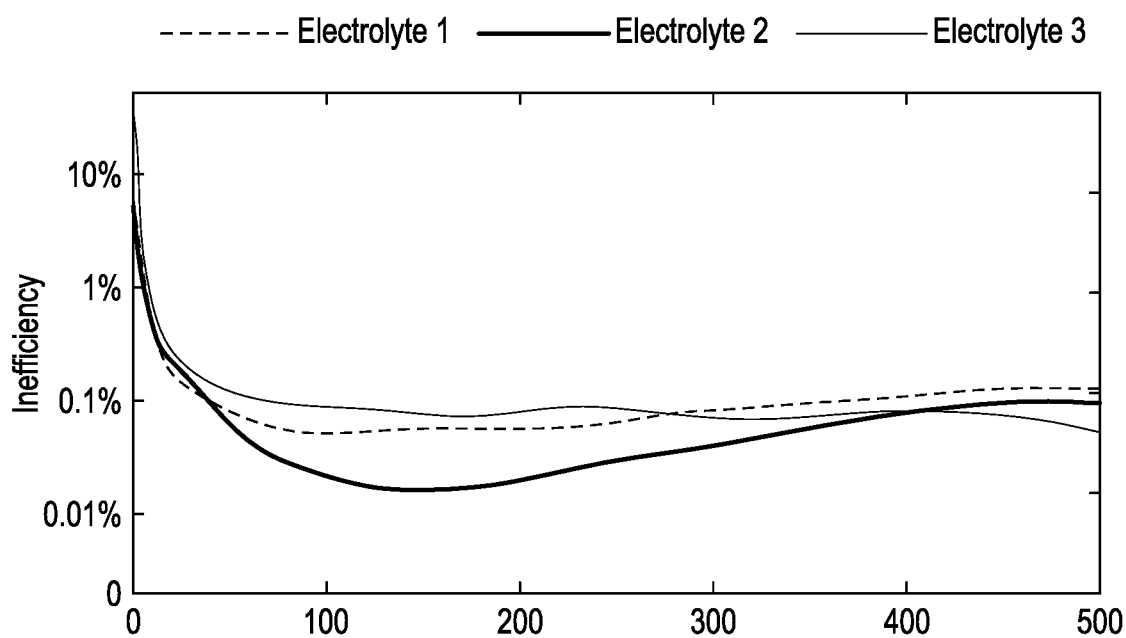
FIG. 1B is a graph of inefficiency of the three difference electrochemical cells of FIG. 1A.

FIGS. 1A and 1B are graphs illustrating the improved results obtained using Electrolyte 3, the electrolyte having a formulation disclosed herein. FIG. 1A illustrates the specific capacity tested over 500 cycles. The specific capacity can be seen trending downward for Electrolytes 1 and 2, while the specific capacity is flattening out at 500 cycles rather than trending downward for Electrolyte 3. FIG. 1B illustrated cell inefficiency over 500 cycles. The inefficiency is trending upward for Electrolytes 1 and 2 while flattening out and remaining stable for Electrolyte 3.

EXAMPLE 2

An electrochemical cell was prepared using a silicon carbon (Si—C) anode paired with lithium cobalt oxide (LCO) cathode. Two different electrolytes were prepared. Electrolyte 1 was prepared using 1.42M LiFSI, 25.04 wt % DMC, 3.28 wt % of FEC as an additive and 71.68 wt % TTE as diluent. Electrolyte 2 was prepared using 1.38M LiFSI, 30.46 wt % DMS, 3.04 wt % FEC as an additive and 66.5 wt % TTE as diluent. The format used was 30×40 mm SLP, tested at 3.0-4.45V, 0.7 C with C/40 CVC.

Figure 2:
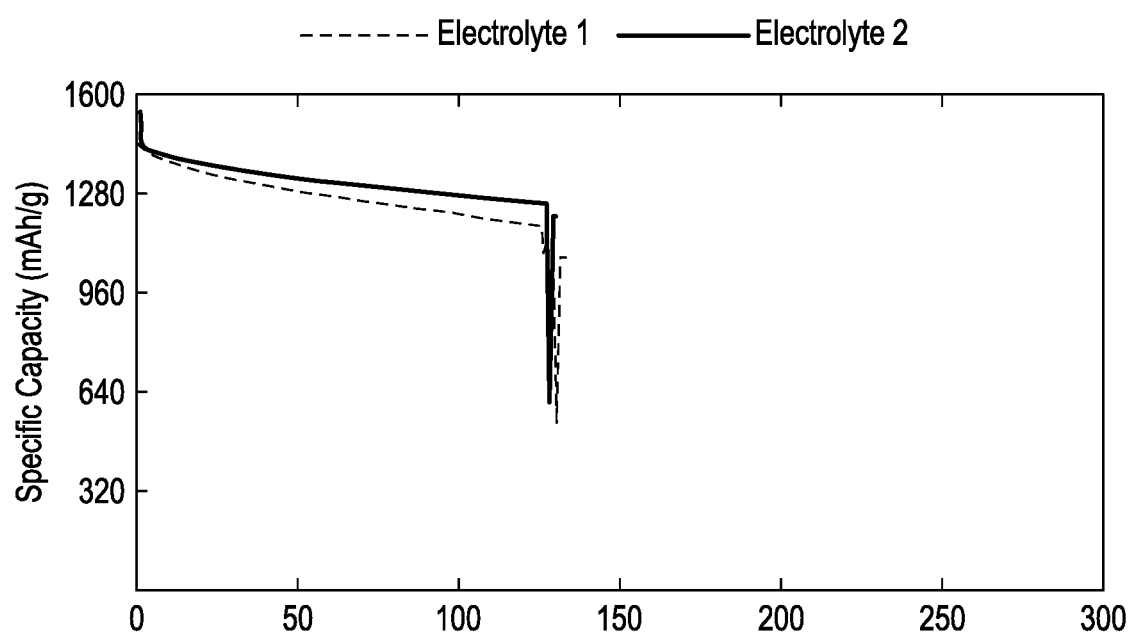
FIG. 2 is a graph of specific capacity of two different electrochemical cells illustrating the improved results using a sulfite-based electrolyte as disclosed herein.

FIG. 2 is a graph illustrating the improved results obtained using Electrolyte 2, the electrolyte having a formulation disclosed herein. FIG. 2 illustrates the specific capacity tested over 100 cycles. The specific capacity can be seen trending downward for Electrolyte 1, while the specific capacity is flattening out at 100 cycles rather than trending downward for Electrolyte 2.

EXAMPLE 3

An electrochemical cell was prepared using an 85% active silicon anode with no graphite paired with an LCO cathode. Two baseline electrolytes were prepared. Baseline electrolyte 1 was prepared using 1.2M LiPF6 and a traditional alkyl carbonate solvent formulation of EC:PC:DEC with a molar ratio of total salt to solvent being about 1:10. Two capacity compensating electrolytes were prepared. Electrolyte 1 was prepared using 1.58M LiFSI, 22.86 wt % DMS, 2.28 wt % FEC as additive and 75.89 wt % TTE as diluent. The molar ratio of total salt to solvent was 1:2. Electrolyte 2 was prepare using 1.33M LiFSI, 32.73 wt % DMS, 2.94 wt % FEC as additive and 65.23 wt % TTE as diluent. The molar ratio of total salt to solvent was 1:3. The format used was 30×40 mm single layer pouch (SLP), tested at 3.0-4.45V, with a 0.2 C capacity check and 2.0 C rate check every 20 cycles, both with C/40 CVC.

Figure 3A:
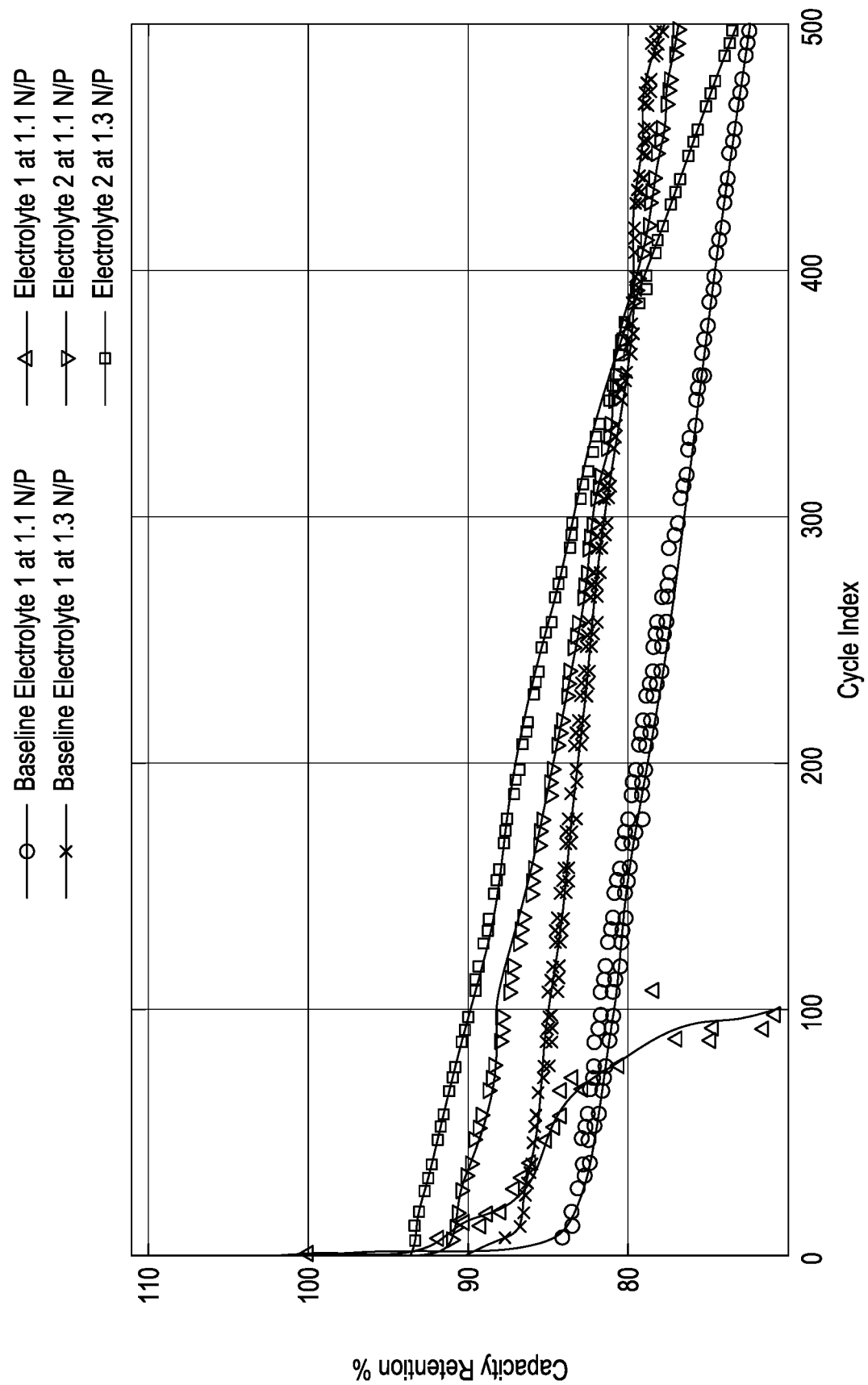
FIG. 3A is a graph of the drop in capacity retention versus cycles, comparing a conventional electrolyte to sulfite-based electrolytes as disclosed herein.
Figure 3B:
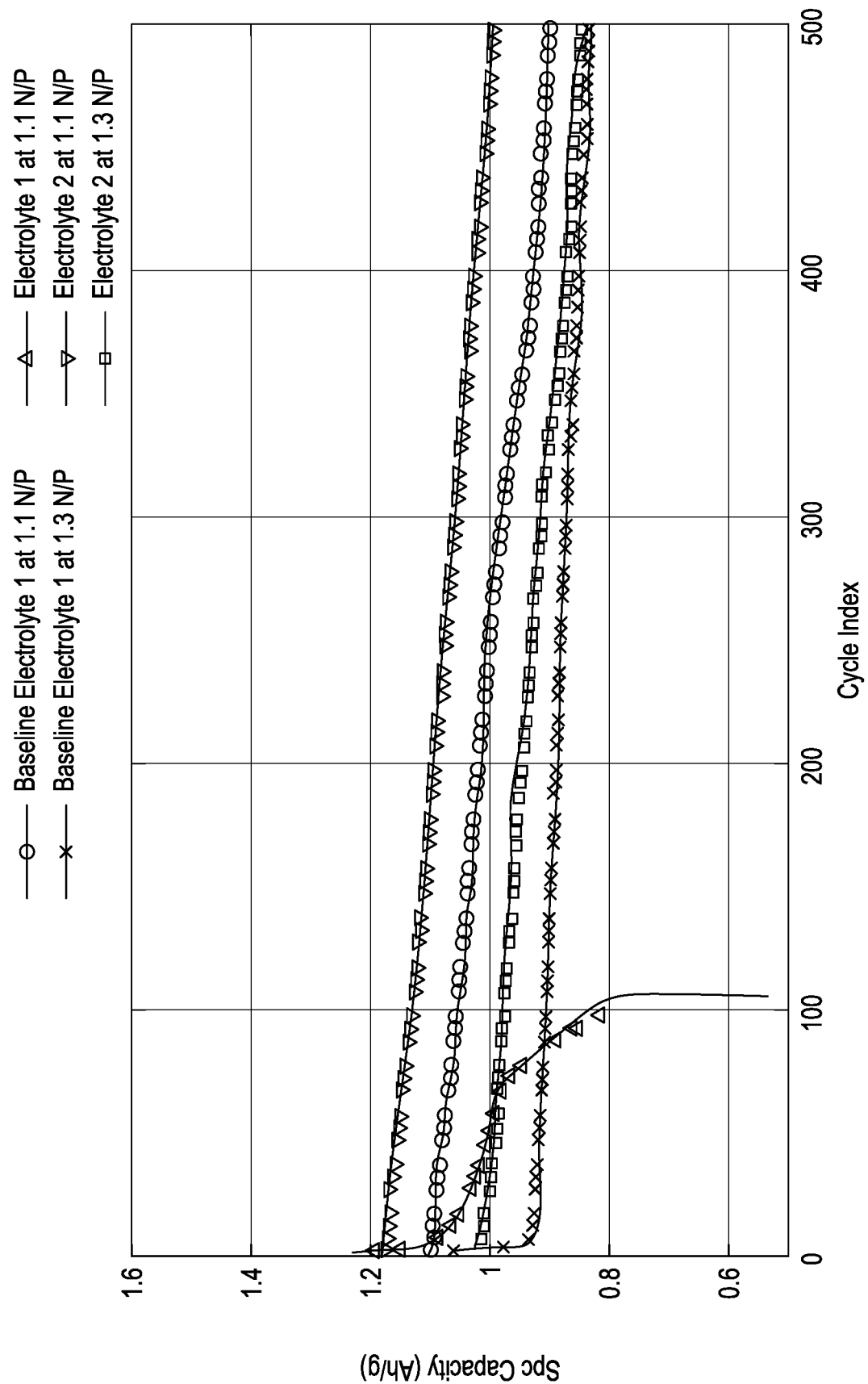
FIG. 3B is a graph of the drop in specific capacity versus cycles, comparing the conventional electrolyte to the sulfite-based electrolytes as disclosed herein.
Figure 4:
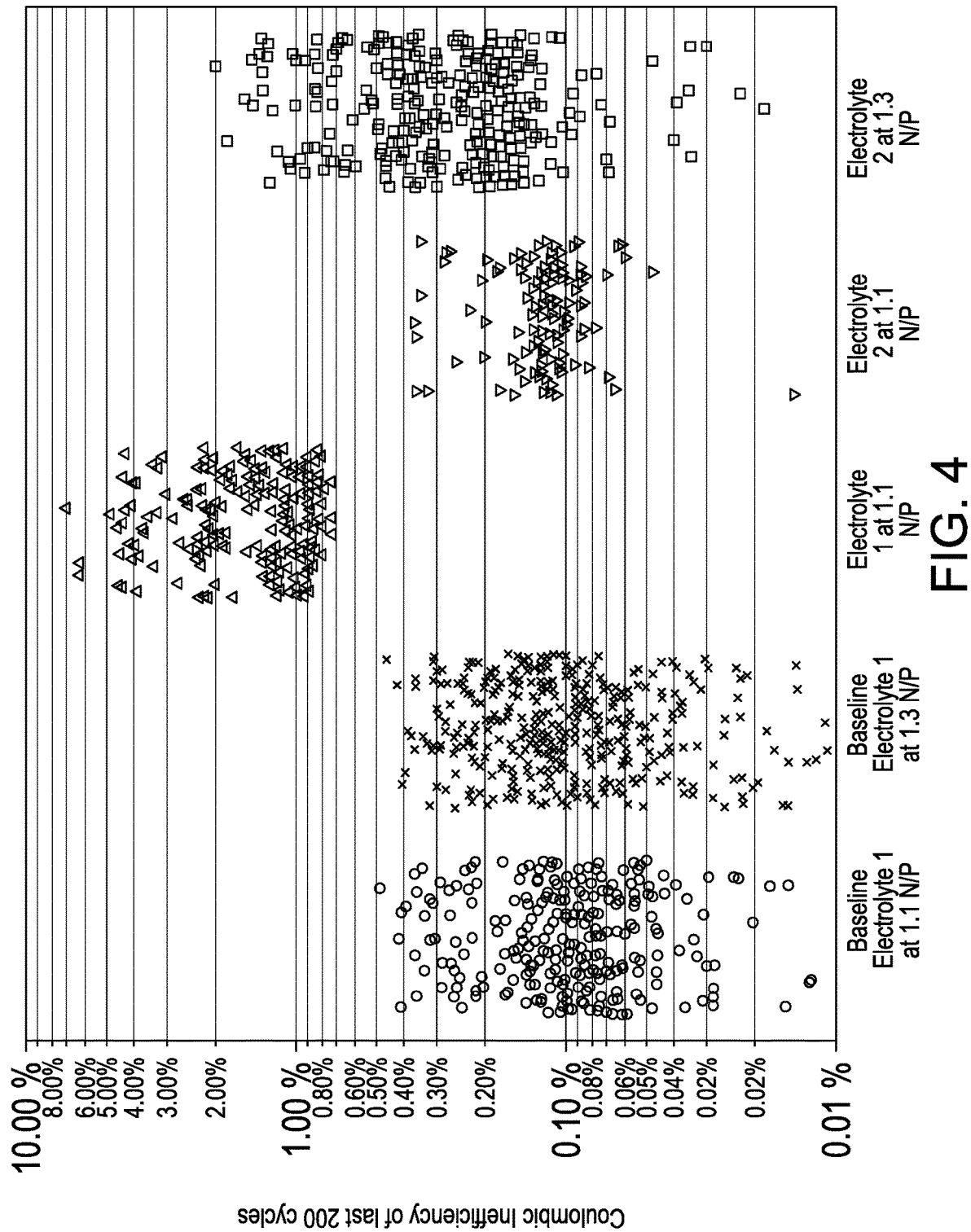
FIG. 4 is a graph of cycling efficiency for the conventional electrolyte and the sulfite-based electrolytes as disclosed herein.

The electrolytes were tested at room temperature (25° C.) in two different battery cells, one with an N/P ratio of 1.1 and one with an N/P ratio of 1.3. The N/P ratio is the capacity ratio between the electrodes in the battery cell. FIG. 3A shows the drop in capacity retention versus cycles, while FIG. 3B shows the drop in specific capacity versus cycles. At room temperature, Electrolyte 2 in a cell with an N/P ratio of 1.1 showed the best performance with good capacity retention and the highest specific capacity. Electrolytes 1 and 2 show lower cycling efficiency than the Baseline electrolyte 1, as shown in FIG. 4, indicating the extra charge capacity from the electrolyte decomposition on the cathode. Such decomposition is able to compensate capacity loss, therefore delivers good capacity retention. This decomposition is most effective at the initial 20 cycles, leading to a flat retention when compared with Baseline electrolyte 1. The data suggests that the higher N/P ratio boosts electrochemical potential, leading to early depletion.

The battery cell testing Electrolyte 2 at the N/P ratio of 1.1 was analyzed after 500 cycles. About 10% sulfur species was identified in both of the anode and the cathode, 11/6% and 10.0% respectively. Li—S species was found in the anode, which is a highly conductive component that is related with improved power capability.

An aspect of the disclosed embodiments is a lithium-ion battery. The power generating element of the lithium-ion battery includes a plurality of unit electrochemical cell layers each including a cathode active material layer, an electrolyte layer including the sulfite-based electrolytes disclosed herein, and an anode active material layer containing a silicon-based material. The cathode active material layer is formed on a cathode current collector and electrically connected thereto and the anode active material layer is formed on an anode current collector and electrically connected thereto. Each of the electrolyte layers can include a separator serving as a substrate and an electrolyte supported by the separator, or just the electrolyte if no separator is required.

Figure 5:
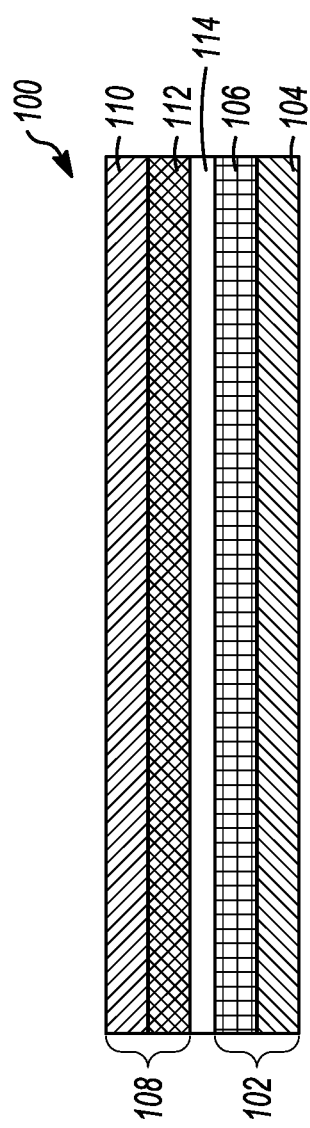
FIG. 5 is a cross-sectional view of an electrochemical cell of the lithium-ion battery.

An electrochemical cell 100 is shown in cross-section in FIG. 5. The electrochemical cell 100 has an anode 102 with an anode current collector 104 and a silicon-based anode active material 106 disposed on the anode current collector 104. The lithium ion battery electrochemical cell 100 also has a cathode 108 with a cathode current collector 110 and a cathode active material 112 disposed over the cathode current collector 110. The cathode 108 and the anode 102 are separated by a separator 114, if needed, and an electrolyte as disclosed herein as a non-limiting example.

The cathode current collector 110 can be, for example, an aluminum sheet or foil. Cathode active materials 112 are those that can occlude and release lithium ions, and can include one or more oxides, chalcogenides, and lithium transition metal oxides which can be bonded together using binders and optionally conductive fillers such as carbon black. Lithium transition metal oxides can include, but are not limited to, $LiCoO_2$, $LiNiO_2$, $LiNi_{0.8}Co_{0.15}Al_{0.05}O_2$, $LiMnO_2$, $Li(Ni_{0.5}Mn_{0.5})O_2$, $LiNi_xCo_yMn_zO_2$, Spinel $Li_2Mn_2O_4$, $LiFePO_4$ and other polyanion compounds, and other olivine structures including $LiMnPO_4$, $LiCoPO_4$, $LiNi_{0.5}Co_{0.5}PO_4$, and $LiMn_{0.33}Fe_{0.33}Co_{0.33}PO_4$. As needed, the cathode active material 112 can contain an electroconductive material, a binder, etc.

The anode active material 106 is a silicon-based material and is otherwise not limited. Non-limiting examples of silicon-based anode material include SiOx, silicon-carbon composites, and Si/SiOx composites. Further, one or more of a binder and a solvent may be used to prepare a slurry that is applied to the current collector, for example. The anode current collector 104 can be a copper or nickel sheet or foil, as a non-limiting example.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:
1. An electrochemical cell, comprising:
an anode comprising a silicon-based active material;
a cathode comprising a cathode active material; and an electrolyte comprising only a linear sulfite-based solvent and a lithium imide salt.

2. The electrochemical cell of claim 1, wherein a molar ratio of the lithium imide salt to the linear sulfite-based solvent is between 1:5 and 1:1.

3. The electrochemical cell of claim 1, wherein the lithium imide salt is LiFSI.

4. The electrochemical cell of claim 1, wherein the lithium imide salt is LiTFSI.

5. The electrochemical cell of claim 1, wherein the lithium imide salt is LiFTFSI.

6. The electrochemical cell of claim 1, wherein the lithium imide salt is LiBETI.

7. The electrochemical cell of claim 1, wherein the linear sulfite-based solvent is dimethyl sulfite.

8. The electrochemical cell of claim 1, wherein the linear sulfite-based solvent is diethyl sulfite.

9. An electrochemical cell, comprising:
   an anode comprising a silicon-based active material;
   a cathode comprising a cathode active material; and
   an electrolyte comprising only dimethyl sulfite as a solvent, at least one lithium imide salt, and optionally independently, an additive and a diluent.

10. The electrochemical cell of claim 9, wherein the at least one lithium imide salt is selected from the group consisting of LiFSI, LiTFSI, LiBETI and LiFTFSI.

11. The electrochemical cell of claim 9, wherein a molar ratio of the at least one lithium imide salt to the at least one linear sulfite-based solvent is between 1:5 and 1:1.

12. The electrochemical cell of claim 9, wherein the additive is less than 10 wt % of the electrolyte.

13. An electrochemical cell, comprising:
   an anode comprising a silicon-based active material;
   a cathode comprising a cathode active material; and
   an electrolyte comprising only a linear sulfite-based solvent and a lithium imide salt, wherein a molar ratio of the lithium imide salt to the linear sulfite-based solvent is between 1:5 and 1:1.

14. The electrochemical cell of claim 13, wherein the lithium imide salt is LiFSI, LiTFSI, LIFTFSI, LiBETI or a combination thereof.

15. The electrochemical cell of claim 13, wherein the linear sulfite-based solvent is dimethyl sulfite, diethyl sulfite, or a combination thereof.

* * * * *